US011200258B2

(12) United States Patent
Hsieh et al.

(10) Patent No.: US 11,200,258 B2
(45) Date of Patent: Dec. 14, 2021

(54) SYSTEMS AND METHODS FOR FAST AND EFFECTIVE GROUPING OF STREAM OF INFORMATION INTO CLOUD STORAGE FILES

(71) Applicant: ACER CLOUD TECHNOLOGY (US), INC., Sunnyvale, CA (US)

(72) Inventors: Meng-Fu Hsieh, New Taipei (TW); Jung-Hsuan Fan, Keelung (TW); Jim Chang, Saratoga, CA (US)

(73) Assignee: Acer Cloud Technology (US), Inc., Sunnyvale, CA (US)

(*) Notice: Subject to any disclaimer, the term of this patent is extended or adjusted under 35 U.S.C. 154(b) by 163 days.

(21) Appl. No.: 16/006,796

(22) Filed: Jun. 12, 2018

(65) Prior Publication Data
US 2019/0188315 A1    Jun. 20, 2019

Related U.S. Application Data

(60) Provisional application No. 62/608,471, filed on Dec. 20, 2017.

(51) Int. Cl.
G06F 16/28      (2019.01)
G06F 16/13      (2019.01)
G06F 16/2455    (2019.01)

(52) U.S. Cl.
CPC ............ *G06F 16/285* (2019.01); *G06F 16/13* (2019.01); *G06F 16/24568* (2019.01)

(58) Field of Classification Search
CPC ... G06F 16/285; G06F 16/24568; G06F 16/13
See application file for complete search history.

(56) References Cited

U.S. PATENT DOCUMENTS

| 9,218,405 | B2 * | 12/2015 | Baumgarten | ........... G06F 16/27 |
| 10,324,773 | B2 * | 6/2019 | Wing | ......................... G06F 1/30 |
| 2009/0228685 | A1 | 9/2009 | Wei et al. | |

(Continued)

FOREIGN PATENT DOCUMENTS

| AU | 2010266433 C1 * | 7/2013 | ......... H04L 67/1095 |
| CN | 107391719 A | 11/2017 | |

OTHER PUBLICATIONS

EP Extended Search Report dated Mar. 6, 2019 in EP Application No. 18212552.6. 10 pages.

*Primary Examiner* — Mark D Featherstone
*Assistant Examiner* — Ranjit P Doraiswamy

(57) ABSTRACT

A new approach is proposed to support grouping and storing a data stream based on the types of data items in the stream for efficient data batch processing and analysis. First, the data stream is uploaded to a cloud storage, wherein the stream of data includes a plurality of data items of different types generated by and collected from different users and/or devices. The data items are then retrieved, grouped and saved by a preprocessing unit into a plurality of batch data queues, wherein data items in each batch data queue are of the same type. One or more batch processing units are then configured to fetch and batch process data items from the batch data queues and store these data items of the same data type to one or more cloud storage files for further processing and analysis on the cloud storage one batch data queue at a time.

20 Claims, 5 Drawing Sheets

(56) References Cited

U.S. PATENT DOCUMENTS

| | | | |
|---|---|---|---|
| 2013/0339473 A1* | 12/2013 | McCaffrey | H04L 67/22 |
| | | | 709/216 |
| 2015/0281319 A1 | 10/2015 | Maturana et al. | |
| 2015/0293974 A1* | 10/2015 | Loo | G06F 16/24568 |
| | | | 707/752 |
| 2015/0332010 A1* | 11/2015 | Olson | G06F 19/322 |
| | | | 705/3 |
| 2015/0363464 A1 | 12/2015 | Alves et al. | |
| 2016/0246695 A1* | 8/2016 | Heikinheimo | G06F 11/277 |
| 2017/0104838 A1 | 4/2017 | Busayarat et al. | |
| 2018/0097748 A1* | 4/2018 | Pienescu | G06F 16/285 |
| 2018/0217882 A1* | 8/2018 | Broadhurst | G06F 9/546 |
| 2019/0098068 A1* | 3/2019 | Iliofotou | H04L 67/02 |

* cited by examiner

200 

```
┌─────────────────────────────────────────────────────────────┐
│ Receive the data stream uploaded to a data queue at a cloud │
│ storage, wherein the data stream includes a plurality of    │
│ data items of different types generated by and collected    │
│ from different users and/or devices                          │
│                         202                                  │
└─────────────────────────────────────────────────────────────┘
```

```
┌─────────────────────────────────────────────────────────────┐
│ Retrieve, group, and place the data items in the data queue │
│ into a plurality of batch data queues based on data types    │
│ of the data items, wherein the data items placed in each    │
│ batch data queue are of the same data type                   │
│                         204                                  │
└─────────────────────────────────────────────────────────────┘
```

```
┌─────────────────────────────────────────────────────────────┐
│ Fetch, batch process, and store data items from one of the  │
│ batch data queues into one or more cloud storage files each │
│ maintaining a same type of the data items on the cloud      │
│ storage during each round of processing                      │
│                         206                                  │
└─────────────────────────────────────────────────────────────┘
```

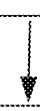

```
┌─────────────────────────────────────────────────────────────┐
│ Continuously fetch and batch process data items from the    │
│ batch data queues one batch data queue at a time until all  │
│ of the batch data queues have been processed and the data   │
│ items in the batch data queues saved into their respective  │
│ cloud storage files for further processing and analysis     │
│                         208                                  │
└─────────────────────────────────────────────────────────────┘
```

FIG. 2

```
int numberOfPartitions = 2;
String partitionKey = yellow1509095905 ; // yellow1509095906 , yellow1509095907 .
int hashCode = printionKey.hashCode();
int result = math.abs(hashCode % numberOfPartitions);
partitionNum = result;

when partitionKey = yellow1509095905 ,
        hashCode = -1853198829
    result = math.abs(-1853198829 % 2) = 1
    partitionNum = partition1 when partitionKey = yellow1509095906 ,
        hashCode = -1853198828
    result = math.abs(-1853198828 % 2) = 0
    partitionNum = partition0 when partitionKey = yellow1509095907 ,
        hashCode = -1853198827
    result = math.abs(-1853198827 % 2) = 1
    partitionNum = partition1
```

Receive a data stream uploaded to a data queue at a cloud storage, wherein the data stream includes a plurality of data items of different types generated by and collected from different users and/or devices
502

Retrieve, group, and place the data items in the data queue into a plurality of batch data queues based on data types of the data items, wherein the data items placed in each batch data queue are of the same data type
504

Divide data items within each batch data queue into a plurality of partitions, wherein different partitions are assigned to and processed by a plurality of data batch processing units
506

Fetch, batch process, and store data items from one of the partitions of each of the batch data queues into a cloud storage file maintaining a same type of the data items on the cloud storage for further processing and analysis, wherein the plurality of data batch processing units are configured to operate on the partitions of the batch data queues in parallel
508

FIG. 5

SYSTEMS AND METHODS FOR FAST AND EFFECTIVE GROUPING OF STREAM OF INFORMATION INTO CLOUD STORAGE FILES

CROSS-REFERENCE TO RELATED APPLICATIONS

This application claims the benefit of U.S. Provisional Patent Application No. 62/608,471, filed Dec. 20, 2017, and entitled "SYSTEMS AND METHODS FOR FAST AND EFFECTIVE METHOD OF GROUPING STREAMING INFORMATION INTO CLOUD STORAGE FILES," which is incorporated herein in its entirety by reference.

BACKGROUND

As data/information are increasingly being stored, managed, and accessed in cloud storage, e.g., on various storages and servers in the cloud, it is becoming more and more important to be able to process and stream/upload enormous amount of data onto the cloud storage, which can be but is not limited to an AWS S3 storage, and to be able to update and/or modify the uploaded data effectively and economically. Here, the data can either be user-generated, e.g., documents and electronic messages, or device-generated, e.g., data generated by mobile devices or sensor data generated or collected by various Internet of Things (IoT) sensors/devices. For data analysis purposes, it is often critical to organize the streams of data into various groups by their sources or types in order for a data analyzer to analyze the differently-grouped data accordingly.

Currently, in order to update/modify a file in the cloud storage, it is often required to download the file from a cloud storage server, and then upload it back to the cloud storage server to replace the existing file after the changes to the file have been made. If the size of the file in the cloud storage is huge and only a few changes are made to this file, a lot of network bandwidth is wasted uploading and downloading the huge file from and to the cloud storage. In some embodiments, a memory buffer is used to implement a batch process unit to avoid this problem, wherein a batch process unit can fetch data from a data queue in the memory buffer and split fetched data by different data types into their own specific storage files. As the volume of data in the data queue increases over time, the data volume and generating time may both become unpredictable. To avoid the possible system out-of-memory issue, it is often necessary to limit the size of the memory buffer and/or fix the process time of the buffer, resulting in the data being split across too many cloud storage files not limited to one data type per file. In addition, system such as AWS lambda processes stream data via events wherein each event only can fetch one data from the data queue, resulting in each event having its own cloud storage file. If all the data files are stored in the cloud storages without compacting or grouping, the data analysis tool needs to waste a lot of I/O and network resources to load data from each of the cloud storage files before conducting the data analysis, which can be very time and resource consuming. It is thus desirable to be able to group same types of data intensively to reduce the burden to the data analysis tools.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 depicts a flowchart of an example of a process to support grouping and storing a data stream into cloud storage files based on data types in accordance with some embodiments.

FIG. 4 depicts an example of a code snippet implementing a formula for even assignment of data items in each batch data queue in accordance with some embodiments.

FIG. 5 depicts a flowchart of an example of a process to support scalable grouping and storing a data stream into cloud storage files based on data types in accordance with some embodiments.

DETAILED DESCRIPTION OF EMBODIMENTS

Figure 1:
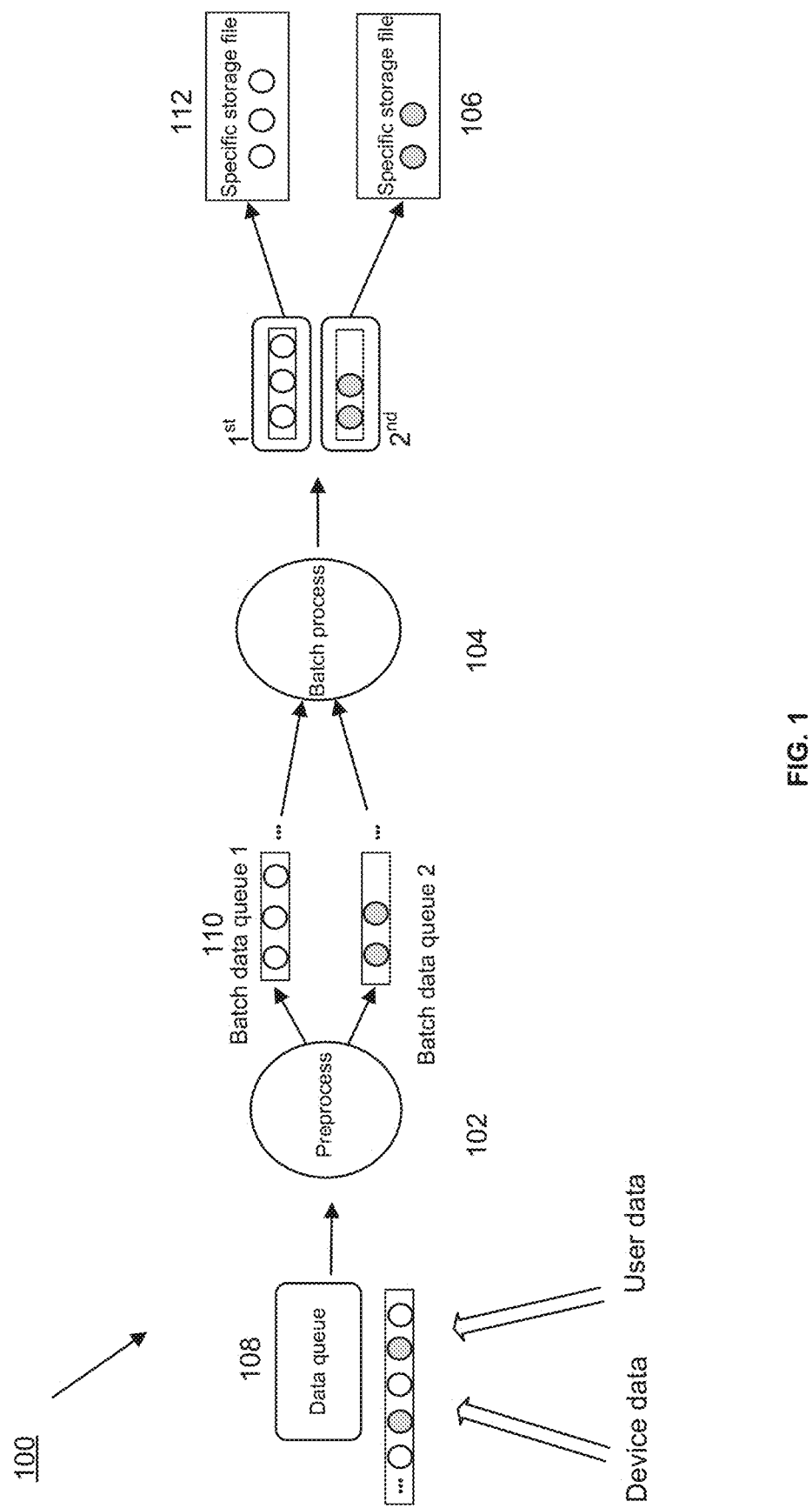
FIG. 1 depicts an example of a system diagram to support grouping and storing a data stream into cloud storage files based on data types in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support grouping and storing a stream of data based on the types of data items in the stream for efficient data batch processing and analysis. First, the stream of data is uploaded/streamed to a cloud storage, wherein the stream of data can include a plurality of data items of different types generated by and collected from different users and/or devices. Once the data items are received in a data queue at the cloud storage, they are retrieved, grouped, and saved by a preprocessing unit into a plurality of batch data queues, wherein data items in each batch data queue are of the same data type. One or more batch processing units are then configured to fetch and batch process data items from one of the batch data queues and store these data items of the same data type to one or more cloud storage files for further processing and analysis on the cloud storage following each round of processing. The batch processing units continue to fetch and process data items from the batch data queues one batch data queue at a time until data items in all of the batch data queues have been saved into their respective cloud storage files.

Under the proposed approach, the stream of data collected in real time from, for example, Internet of Things (IoT) devices can be batch grouped and processed more efficiently in a timely manner. As the grouped data items are stored in cloud data files according to their data types, it makes it easier for data analysis tools to perform subsequent analysis on the collected data items. Since the collected data can be processed and analyzed in the cloud storage, the proposed approach avoids using unnecessary I/O resources, memories, system burdens, and the bandwidths.

FIG. 1 depicts an example of a system diagram 100 to support grouping and storing a data stream into cloud storage files based on data types. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a data preprocessing engine/unit 102, a data batch processing engine/unit 104, and a data cloud storage unit 106 at a cloud storage or data center. These engines and units run on one or more computing units/appliances/hosts (not shown) each with software instructions stored in a storage unit such as a non-volatile memory (also referred to as secondary memory) of the computing unit for practicing one or more processes. When the software instructions are executed, at least a subset of the software instructions is loaded into memory (also referred to as primary memory) by one of the computing units of the host, which becomes a special purposed one for practicing the processes. The processes may also be at least partially embodied in the host into which computer program code is loaded and/or executed, such that, the host becomes a special purpose computing unit for practicing the processes. When implemented on a general-purpose computing unit, the computer program code segments configure the computing unit to create specific logic circuits.

In the example of FIG. 1, each host can be a computing device, a communication device, a storage device, or any computing device capable of running a software component. For non-limiting examples, a computing device can be but is not limited to a server machine, a laptop PC, a desktop PC, a tablet, a Google's Android device, an iPhone, an iPad, and a voice-controlled speaker or controller. Each host has a communication interface (not shown), which enables the engines and the units to communicate with each other, the user, and other devices over one or more communication networks following certain communication protocols, such as TCP/IP, http, https, ftp, and sftp protocols. Here, the communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

In the example of FIG. 1, a stream of data items is uploaded to a data queue 108 of a cloud-based storage over a network, wherein the data items can be of different types reflecting their sources, e.g., how and from where they are generated and collected. For non-limiting examples, the data items can either be user-generated, e.g., user-drafted documents and electronic messages, or device-generated, e.g., data items generated by mobile devices or sensor data generated or collected by various IoT devices. As shown by the example of FIG. 1, the stream of data items in data queue 108 are depicted as circles with different shades representing different data types.

As the number of data items in the data queue 108 increases over time, the data queue 108, which is first-in first-out (FIFO), may run out of pre-allocated buffer size over time especially when the data items may be collected and received at the data queue 108 at a faster pace than being retrieved from the data queue 108. To avoid such out-of-memory issue, the data preprocessing unit 102 is configured to retrieve a data item from the data queue 108 whenever a new data item is added to the data queue 108, so that the data queue 108 does not run out of allocated memory/buffer. The data preprocessing unit 102 is then configured to place the retrieved data item into one of a plurality of batch data queues 110 that match the data type of data item. As shown by the example of FIG. 1, each batch data queues 110 contains a specific type of data items and the different types of data items in the data queue 108 are split into batch data queues 110 of different types.

In the example of FIG. 1, the data batch processing unit 104 is configured to retrieve/fetch a set of data items from one of the batch data queues 110 for batch processing during each round of processing and store the retrieved set of data items to its own specific cloud data storage file 112 on the data cloud storage unit 106, wherein each cloud data storage file 112 only includes data items of the same type as the retrieved set of data items. In some embodiments, the data batch processing unit 104 is configured to batch process the data items one batch data queue at a time until all of the batch data queues 110 have been processed. As shown by the example of FIG. 1, when the data batch processing unit 104 finishes the first round of batch processing, it fetches and batch processes three data items depicted as circles from batch data queue 1 and stores them into a cloud storage file 112. The data batch processing unit 104 then retrieves two data items from batch data queue 2 of a different data type and saves them to a separate cloud storage file on the cloud storage unit 106. Following two rounds of batch processing, the data batch processing unit 104 batch processes and stores five data items of different types into two cloud storage files.

FIG. 2 depicts a flowchart 200 of an example of a process to support grouping and storing a data stream into cloud storage files based on data types. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where a stream of data is uploaded to a data queue at a cloud storage, wherein the stream of data includes a plurality of data items of different types generated by and collected from different users and/or devices. The flowchart 200 continues to block 204, where the data items in the data queue are retrieved, grouped and placed into a plurality of batch data queues, wherein the data items in each batch data queue are of the same data type. The flowchart 200 continues to block 206, where data items from one of the batch data queues are fetched, batch processed, and stored into one or more cloud storage files each maintaining a same type of the data items on the cloud storage for further processing and analysis. The flowchart 200 ends at block 208, where the data items are continuously being fetched and batch processed from the batch data queues one batch data queue at a time until data items in all of the batch data queues have been saved into their respective cloud storage files for further processing and analysis.

Figure 3:
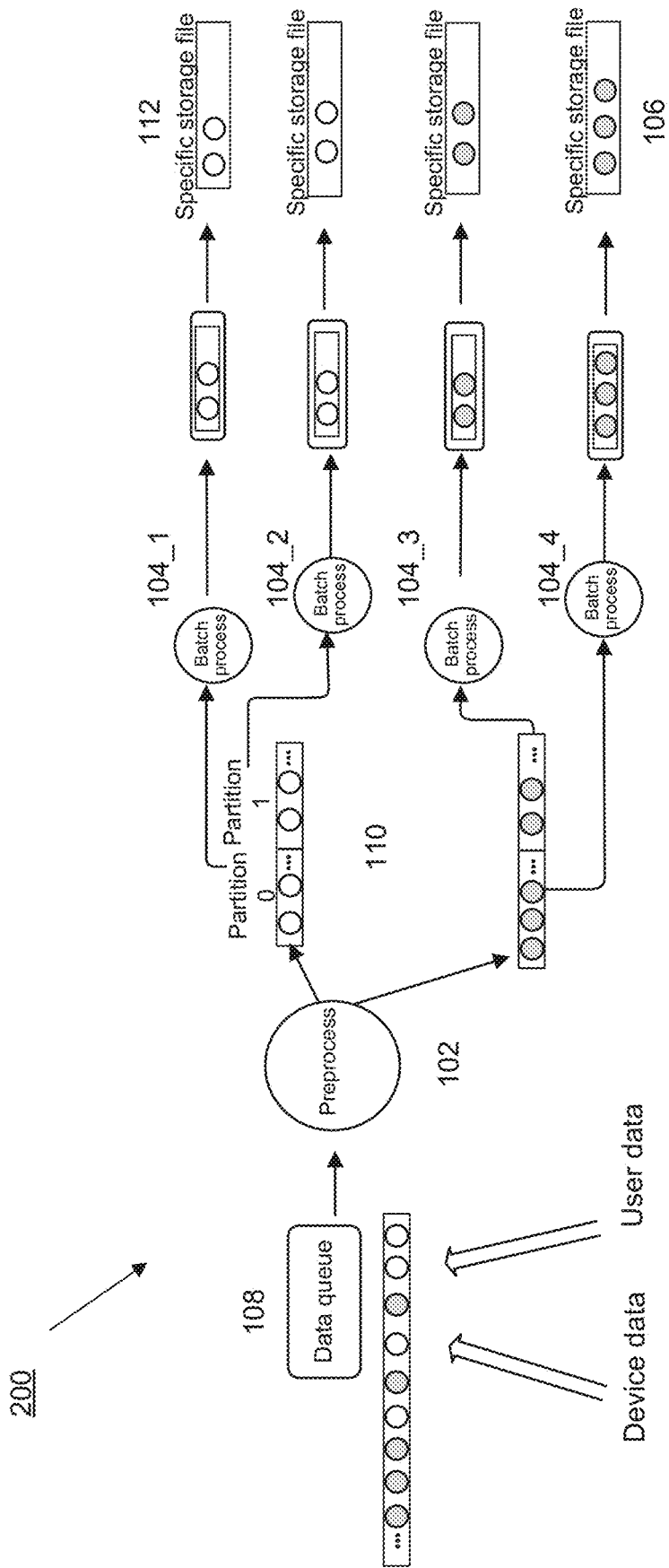
FIG. 3 depicts an example of a system diagram to support scalable grouping and storing a data stream into cloud storage files based on data types where multiple data batch processing units are deployed and utilized in accordance with some embodiments.

In some circumstances, scalability for grouping and storing of data items is important especially when a large number of data items are generated and uploaded to the data stream during a short period of time. FIG. 3 depicts an example of a system diagram 200 to support scalable grouping and storing a data stream into cloud storage files based on data types where multiple data batch processing units 104 are deployed and utilized. In some embodiments, after the data stream is split into multiple batch data queues 110 by the data preprocessing unit 102 based on the types of the data items, each batch data queue 110 may be further divided by the data preprocessing unit 102 into multiple partitions, e.g., partition 0 and partition 1 as shown by the example of FIG. 3, and multiple data batch processing units, e.g., 104_1 and 104_2, are configured to fetch and process data items from different partitions of the same batch data queue 110 in parallel and/or at the same time in order to speed up batch processing of the data items of the same type. In some embodiments, the data items in each partition can only be processed by a single data batch processing unit 104 to make sure that each data item in the batch data queue 110 is processed exactly once. Each data batch processing unit 104 is then configured to store the data items it processes to a specific cloud storage file 112 on the cloud storage unit 106. In the example of FIG. 3, four data batch processing units 104_1 to 104_4 are configured to multi-process data items in two batch data queues 110 in parallel and to store data items they process to four separate cloud storage files 112 wherein some of the cloud storage files 112 may include data items of the same type coming from different partitions of the same batch data queue 110.

In some embodiments, the data preprocessing unit 102 is configured to partition each batch data queue 110 by assigning data items in the batch data queue 110 to different partitions based on hash value of a partition key and the number of partitions to be created for the batch data queue 110. For a non-limiting example, the following formula may be adopted by the data preprocessing unit 102 to assign each data item in a batch data queue 110 to one of the partitions:

math.abs(partitionKey.hashCode( )% numberOfPartitions)

In some embodiments, when the type of the data items is used as the partition key, the data preprocessing unit 102 may assign all data items of the same type in a batch data queue 110 into the same partition, resulting in uneven loads among the data batch processing units 104 allocated to the partitions of the batch data queue 110, e.g., one data batch processing unit 104 can be overloaded while the other one may be idle.

In some embodiments, the data preprocessing unit 102 is configured to evenly assign data items in each batch data queue 110 into a set of partitions by including a unique serial number, which can be but is not limited to a timestamp of the data item, with the type (represented by color) of the data item to form a new partition key using an example of the following formula:

math.abs((color+timestamp).hashCode % numberOfPartitions)

FIG. 4 depicts an example of a code snippet implementing the formula above for even assignment of data items in each batch data queue 110. As shown by the example of FIG. 4, a new partition key is formulated to include a unique serial number. As a result, data items of the same type or color are evenly assigned to different partitions, Partition 0 or Partition 1 as shown in FIG. 3.

In some embodiments, the system 100 for grouping and storing a stream of data items can be implemented via Kafka, which is a real time stream-processing software platform for real-time data pipelining and streaming. Specifically, the data queue 108 can be implemented as a streaming queue that continuously accepts and outputs data items from different sources in the data stream in real time. When an event report with one topic generated by a Kafka producer about data items collected from the IoT devices is published and received at the data queue 108, the data preprocessing unit 102 subscribes to the topic so that the it can use eventReportData.eventType+timestamp as a Kafka partition key and use batchTopic as Kafka topic to assign each eventReportData to the batch data queues 110 and their respective partitions. When multiple data batch processing units 104 process the data items in the batch data queues 110 and their respective partitions simultaneously, each data batch processing unit 104 uses Kafka consumer based on batchTopic to fetch data items from the batch data queues and their partitions. Fetched data items are then grouped by their eventType and stored in corresponding cloud storage files 112.

FIG. 5 depicts a flowchart 500 of an example of a process to support scalable grouping and storing a data stream into cloud storage files based on data types. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 5, the flowchart 500 starts at block 502, where a stream of data is uploaded to a data queue at a cloud storage, wherein the stream of data includes a plurality of data items of different types generated by and collected from different users and/or devices. The flowchart 500 continues to block 504, where the data items in the data queue are retrieved, grouped and placed into a plurality of batch data queues, wherein the data items in each batch data queue are of the same data type. The flowchart 500 continues to block 506, where data items within each batch data queue are divided into a plurality of partitions, wherein different partitions are assigned to and processed by a plurality of data batch processing units. The flowchart 500 ends at block 508, where data items from each of the partitions of each of the batch data queues are fetched, batch processed, and stored by each of the plurality of data batch processing units into a cloud storage file maintaining a same type of the data items on the cloud storage for further processing and analysis, wherein the plurality of data batch processing units are configured to operate on the partitions of the batch data queues in parallel.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system to support grouping and storing a data stream into cloud storage files based on data types, comprising:
   a data preprocessing unit running on a host and configured to
      receive the data stream uploaded to a data queue at a cloud storage, wherein the data stream includes a plurality of data items of different types generated by and collected from different users and/or devices;
      retrieve the data items from the data queue and further group and store the grouped data items into a plurality of batch data queues based on data types of the data items, wherein the retrieving, the grouping, and the placing the data items from the data queue into the plurality of batch data queues occurs responsive to when new data items are received at the data queue, and wherein the data items placed in each batch data queue are of the same data type;
   a data batch processing unit running on a host and configured to
      fetch, batch process, and store data items from one of the batch data queues into one or more cloud storage files each maintaining a same type of the data items on the cloud storage during each round of processing;
      continuously fetch and batch process data items from the batch data queues one batch data queue at a time until all of the batch data queues have been processed and the data items in the batch data queues saved into their respective cloud storage files for further processing and analysis.

2. The system of claim 1, wherein:
the data items in the data stream are generated or collected by mobile devices and/or Internet of Things (IoT) devices.

3. The system of claim 1, wherein:
each cloud data storage file only includes data items of the same type.

4. A system to support scalable grouping and storing a data stream into cloud storage files based on data types, comprising:
   a data preprocessing unit running on a host and configured to
      receive the data stream uploaded to a data queue at a cloud storage, wherein the data stream includes a plurality of data items of different types generated by and collected from different users and/or devices;
      retrieve the data items from the data queue and further group and store the grouped data items into a plurality of batch data queues based on data types of the data items, wherein each batch data queue is divided into a plurality of partitions, wherein the data items placed in each partition of batch data queue are of the same data type;
      divide data items within each batch data queue into a plurality of partitions, wherein different partitions of a same batch data queue are assigned to and processed by a plurality of data batch processing units in parallel;
   said plurality of data batch processing units each running on a host and configured to
      fetch, batch process, and store data items from one of the partitions of the same batch data queue into a cloud storage file maintaining a same type of the data items on the cloud storage for further processing and analysis, wherein the plurality of data batch processing units are configured to operate on the different partitions of the same batch data queue in parallel.

5. The system of claim 4, wherein:
the data items in each partition is only processed by one data batch processing unit so that each data item in the batch data queue is processed exactly once.

6. The system of claim 4, wherein:
the data preprocessing unit is configured to partition each batch data queue by assigning data items in the batch data queue to different partitions based on hash value of a partition key and the number of partitions to be created for the batch data queue.

7. The system of claim 6, wherein:
the type of each data item is used as the partition key.

8. The system of claim 7, wherein:
the data preprocessing unit is configured to evenly assign data items in each batch data queue into the set of partitions by including a unique serial number, with the type of the data item to form a new partition key.

9. The system of claim 4, wherein:
the system is implemented via a software platform for real-time data pipelining and streaming, wherein the data queue is a streaming queue that continuously accepts and outputs data items from different sources in the data stream in real time.

10. The system of claim 9, wherein:
the data preprocessing unit is configured to subscribe to a topic when an event report with the topic is generated and published for data items collected from an Internet of Things (IoT) device so that the data preprocessing unit can assign the data items to the batch data queues and their respective partitions.

11. The system of claim 10, wherein:
the data batch processing units are configured to process the data items in the batch data queues and their respective partitions by fetching the data items from the batch data queues and their partitions based on the topic.

12. A computer-implemented method to support grouping and storing a data stream into cloud storage files based on data types, comprising:
   receiving the data stream uploaded to a data queue at a cloud storage, wherein the data stream includes a plurality of data items of different types generated by and collected from different users and/or devices;

retrieving the data items from the data queue and further grouping and storing the grouped data items into a plurality of batch data queues based on data types of the data items, wherein the retrieving, the grouping, and the placing the data items from the data queue into the plurality of batch data queues occurs responsive to when new data items are received at the data queue, and wherein the data items placed in each batch data queue are of the same data type;

fetching, batch processing, and storing data items from one of the batch data queues into one or more cloud storage files each maintaining a same type of the data items on the cloud storage during each round of processing;

continuously fetching and hatching process data items from the batch data queues one batch data queue at a time until all of the batch data queues have been processed and the data items in the batch data queues saved into their respective cloud storage files for further processing and analysis.

13. The computer-implemented method of claim 12, further comprising:

generating or collecting the data items in the data stream are by mobile devices and/or Internet of Things (IoT) devices.

14. A computer-implemented method to support scalable grouping and storing a data stream into cloud storage files based on data types, comprising:

receiving the data stream uploaded to a data queue at a cloud storage, wherein the data stream includes a plurality of data items of different types generated by and collected from different users and/or devices;

retrieving the data items from the data queue and further grouping and placing the grouped data items into a plurality of batch data queues based on data types of the data items, wherein each batch data queue is divided into a plurality of partitions, wherein the data items placed in each partition of batch data queue are of the same data type;

dividing data items within each batch data queue into a plurality of partitions, wherein different partitions of a same batch data queue are assigned to and processed by a plurality of data batch processing units in parallel;

fetching, batch processing, and storing data items by each of the plurality of data batch processing units from one of the partitions of the same batch data queue into a cloud storage file maintaining a same type of the data items on the cloud storage for further processing and analysis, wherein the plurality of data batch processing units are configured to operate on the different partitions of the same batch data queue in parallel.

15. The computer-implemented method of claim 14, further comprising:

processing the data items in each partition only by one data batch processing unit so that each data item in the batch data queue is processed exactly once.

16. The computer-implemented method of claim 14, further comprising:

partitioning each batch data queue by assigning data items in the batch data queue to different partitions based on hash value of a partition key and the number of partitions to be created for the batch data queue, wherein the type of each data item is used as the partition key.

17. The computer-implemented method of claim 16, further comprising:

evenly assigning data items in each batch data queue into the set of partitions by including a unique serial number, with the type of the data item to form a new partition key.

18. The computer-implemented method of claim 14, further comprising:

utilizing a software platform for real-time data pipelining and streaming, wherein the data queue is a streaming queue that continuously accepts and outputs data items from different sources in the data stream in real time.

19. The computer-implemented method of claim 18, further comprising:

subscribing to a topic when an event report with the topic is generated and published for data items collected from an Internet of Things (IoT) device so that the data preprocessing unit can assign the data items to the batch data queues and their respective partitions.

20. The computer-implemented method of claim 19, further comprising: processing the data items in the batch data queues and their respective partitions by fetching the data items from the batch data queues and their partitions based on the topic.

* * * * *